July 5, 1932.  C. C. WHITTAKER  1,865,987
AIR FILTER
Filed Sept. 6, 1930
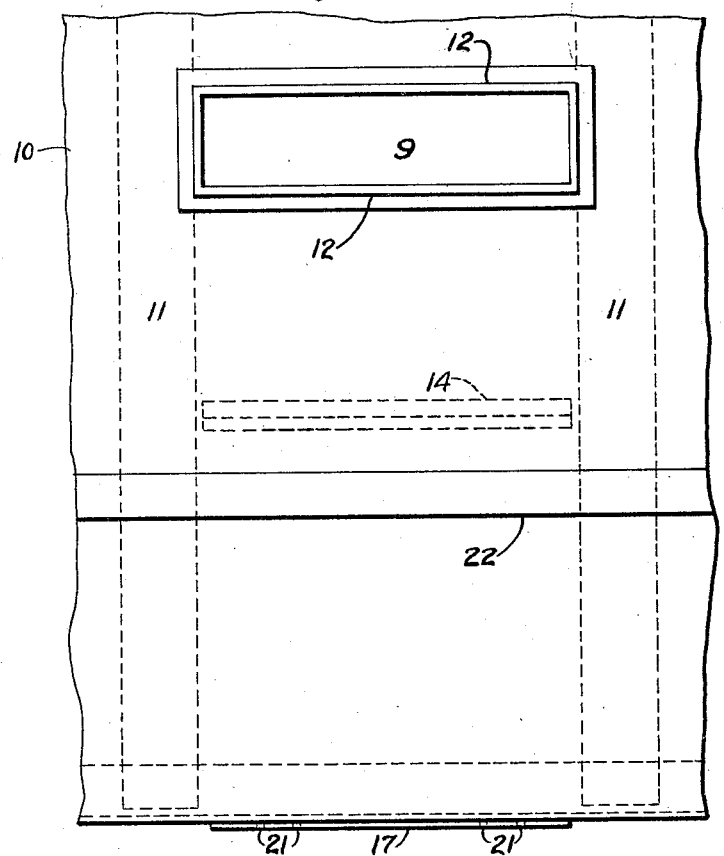
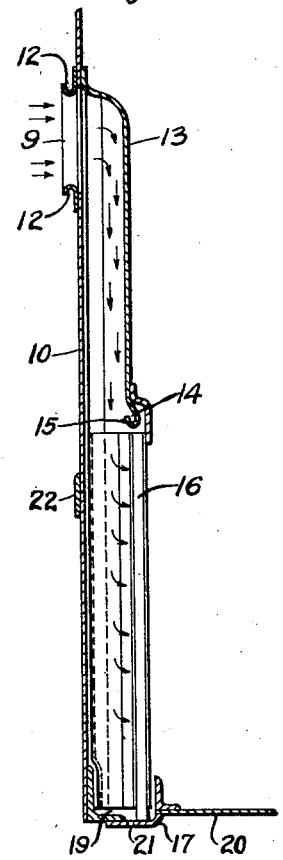
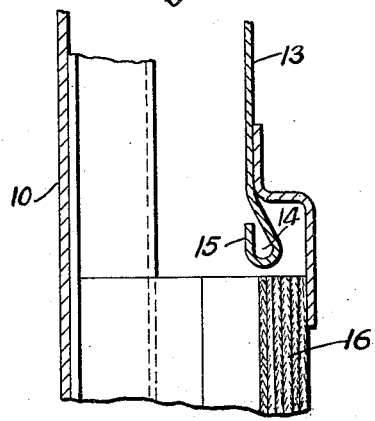
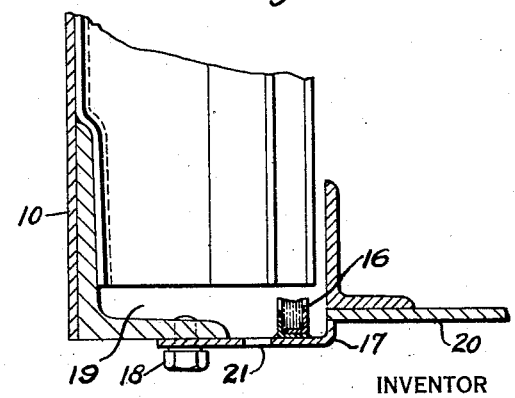
INVENTOR
Charles C. Whittaker
BY
ATTORNEY Patented July 5, 1932

1,865,987

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

AIR FILTER

Application filed September 6, 1930. Serial No. 480,150.

My invention relates to air filters or cleaners.

When the air which is used for ventilating electrical apparatus is kept relatively free from dirt and suspended moisture, the maximum life of the insulation is obtained. It is, therefore, necessary to pass the air through a filter before it is taken into the ventilating system.

An object of my invention, generally stated, is to provide an air filter which shall be simple and efficient in operation and which may be readily and economically manufactured.

A more specific object of my invention is to prevent suspended moisture from passing through an air filter and entering a ventilating system.

For a fuller understanding of the nature and objects of the invention, reference may be had to the following detailed description, taken in conjunction with the accompanying drawing in which:

Figure 1 is a view, in front elevation, of an air filter constructed in accordance with my invention, showing the air filter mounted on the side of a locomotive cab;

Fig. 2 is a view, partly in side elevation and partly in section, of the air filter shown in Fig. 1, and Figs. 3 and 4 are enlarged sectional views showing details of the construction.

As shown in the drawing, a rectangular opening 9 is provided in a side sheet 10 of a locomotive cab. The side sheet 10 may be utilized as a side wall of an air filter through which air is drawn for cooling the motors and other apparatus located in the locomotive cab. The air which enters the opening 9 is directed through the filter by end walls 11, shown in Fig. 1 by broken lines, and by a baffle plate 13, as shown in Fig. 2. The opening 9 may be located near the top of the cab, at the point farthest from the road-bed in order that the air which enters the filter shall be relatively clean.

It will be observed that the opening 9 is surrounded by a gutter 12 which catches the water that runs down the side of the cab during a rainstorm, and prevents it from entering the ventilating system. The gutter 12 may be constructed of strips of metal of a J shape which are mounted on the side sheet 10 around the opening 9.

With a view to collecting any moisture, in the form of rain or dense fog, that may enter through the opening 9, the baffle sheet 13 is placed directly opposite the opening in such manner that the water particles are thrown against it. The water which collects on the baffle sheet drains to the bottom where it is caught by a gutter 14, from which it is drained and thus prevented from passing on through the air filter.

In order that the gutter 14 shall not interfere with the air stream flowing downward, it is offset, or curved backward, as shown in the drawing, the front edge 15 being in line with the baffle sheet 13.

A filter screen 16 is provided for removing the particles of dirt which are carried through the opening 9 by the air stream. The screen 16 may be constructed of any material suitable for this purpose. However, it has been found that a screen composed of several layers of expanded metal, which has been soaked in a heavy oil and drained, is satisfactory. The sheets of metal are so shaped and disposed that the direction of the flow of the air is being continually changed as it passes through the screen. The particles of dirt are caught and held by the oil as the air flows through the filter. When the screen becomes full of dirt, it may be removed and cleaned. New oil may be applied to the sheets of metal, and the screen replaced in the filter. When it is desired to remove the screen 16, a plate 17, to which the screen is welded, may be removed by loosening bolts 18 (Fig. 4) and the screen dropped through the floor of the locomotive cab.

It will be observed that the screen 16 is mounted below the baffle plate 13 in such manner that the air flows through the screen in a horizontal direction, as indicated by the arrows in Fig. 2. The area of the screen 16 is approximately four times the area of the opening 9, which permits the air to flow through the screen at a relatively slow velocity, thus preventing the air from blowing the oil from the metal plates.

Because of the relatively slow velocity of the air through the screen, snow, which is carried through the opening 9, is deposited at the bottom of a chamber 19, on the inlet side of the screen 16 and also in an aisle 20, on the outlet side of the screen. After the snow has been melted, the water is drained from the cab floor through holes 21, provided in the plate 17.

It will be seen that an air filter constructed in the foregoing manner does not decrease the strength of the side sheet 10 of the locomotive cab. The area of the opening 9 is relatively small, also it is located above a reinforcing bar 22 in such manner that it is not necessary to cut the bar to provide an opening for the air to enter the filter.

Since numerous changes may be made in the above-described construction, and different embodiments of the invention may be made without departing from the spirit and scope thereof, it is intended that all matter contained in the foregoing description, or shown in the accompanying drawing, shall be interpreted as illustrative and not in a limiting sense.

I claim as my invention:

1. An air cleaner comprising a filter screen, a supporting structure for the screen, a gutter surrounding an opening through which air enters the cleaner, a baffle plate disposed opposite the opening to collect particles of moisture that enter through the opening, and means attached to the baffle plate for catching the moisture that collects on the baffle plate to prevent it from entering the filter screen.

2. An air cleaner comprising a filter screen, a supporting structure for the screen, a gutter surrounding an opening through which air enters the cleaner, a baffle plate disposed opposite the opening to collect particles of moisture that enter through the opening, and a gutter formed on the bottom of the baffle plate to catch the moisture that collects on the baffle plate to prevent it from entering the filter screen.

3. An air cleaner comprising a filter screen, a supporting structure for the screen, a gutter surrounding an opening through which air enters the cleaner, a baffle plate disposed opposite the opening to collect particles of moisture that enter through the opening, and a gutter disposed at the bottom of the baffle plate to catch the moisture that collects on the baffle plate to prevent it from entering the filter screen, said gutter being so offset that the edge of the gutter is substantially in line with the baffle plate to prevent obstructing the air flow past the gutter.

4. In an air cleaner, in combination, a vertically mounted filter screen, a supporting structure for the screen, a gutter surrounding an opening through which air enters the cleaner, and a vertical baffle plate disposed opposite the opening and above the filter screen for directing the air through the filter screen, the area of the screen being larger than the area of the opening in order that the velocity of the air through the screen shall be less than through the opening.

5. An air cleaner comprising a filter screen, a supporting structure for the screen, a gutter surrounding an opening through which air enters the cleaner, a vertical baffle plate disposed opposite the opening to direct the air through the filter screen and to collect particles of moisture that enter through the opening, and a gutter attached to the lower edge of the baffle plate to catch the moisture that collects on the baffle plate to prevent it from entering the filter screen, the edge of said gutter being substantially in line with the baffle plate to permit air to flow readily past the gutter.

6. An air cleaner comprising a filter screen, a supporting structure for the screen, a gutter surrounding an opening through which air enters the cleaner, a vertical baffle plate disposed opposite the opening and above the filter screen to direct the air through the screen and to collect moisture that enters through the opening, and a gutter formed on the lower edge of the baffle plate to prevent the moisture that collects on the baffle plate from entering the filter screen, said gutter being so offset that its edge is substantially in line with the baffle plate to prevent obstructing the air flow past the gutter.

In testimony whereof I have hereunto subscribed my name this 22nd day of August, 1930.

CHARLES C. WHITTAKER.